United States Patent [19]
Jones et al.

[11] Patent Number: 5,571,993
[45] Date of Patent: Nov. 5, 1996

[54] OUTLET BOXES

[75] Inventors: Michael A. Jones, Sydney, Australia; Alan R. Pond, Chingford, England; Alan C. Penfield, Chadwell Heath, England; Derek G. McCarty, London, England

[73] Assignee: Caradon MK Electric Limited, Essex, England

[21] Appl. No.: 167,942

[22] PCT Filed: Jun. 18, 1992

[86] PCT No.: PCT/GB92/01101

§ 371 Date: Dec. 17, 1993

§ 102(e) Date: Dec. 17, 1993

[87] PCT Pub. No.: WO93/00732

PCT Pub. Date: Jan. 7, 1993

[30] Foreign Application Priority Data

Jun. 20, 1991 [GB] United Kingdom .................. 9113409
Jun. 20, 1991 [GB] United Kingdom .................. 9113425

[51] Int. Cl.⁶ .................................................. H02G 3/08
[52] U.S. Cl. ..................................... 174/57; 220/3.7
[58] Field of Search ........................ 174/49, 54, 57, 174/58; 220/3.2, 3.3, 3.7, 3.8

[56] References Cited

U.S. PATENT DOCUMENTS

| | | | |
|---|---|---|---|
| 3,646,244 | 2/1972 | Cole | 174/57 |
| 3,662,085 | 5/1972 | Robinson et al. | 174/48 |
| 3,859,454 | 1/1975 | Mann | 174/66 |
| 4,098,423 | 7/1978 | Marrero | 220/3.6 |
| 4,634,015 | 1/1987 | Taylor | 220/3.7 |
| 4,699,289 | 10/1987 | You | 220/3.7 |
| 4,753,361 | 6/1988 | Medlin, Jr. | 220/3.6 |
| 4,918,259 | 4/1990 | Hanson | 174/66 |
| 5,171,939 | 12/1992 | Shotey | 174/67 |

FOREIGN PATENT DOCUMENTS

| | | |
|---|---|---|
| 0343754 | 11/1989 | European Pat. Off. . |
| 1304089 | 6/1963 | France . |
| 3743192 | 6/1989 | Germany . |
| 0597014 | 8/1959 | Italy . |
| 0227099 | 7/1925 | United Kingdom . |
| 1583946 | 2/1981 | United Kingdom . |
| 2194975 | 3/1988 | United Kingdom . |
| 685129 | 12/1994 | United Kingdom . |

*Primary Examiner*—Kristine L. Kincaid
*Assistant Examiner*—Michael Cornelison
*Attorney, Agent, or Firm*—Sherman and Shalloway

[57] ABSTRACT

An electrical outlet box for raised floors is formed as a metal box (10) in which electrical sockets (20) or switches can be mounted in the bottom; the box has a lid assembly (14) which is vertically adjustable relative to the box by means of a pawl (62, 63) and ratchet (67, 68) arrangement. This arrangement enables rapid adjustment of the vertical distance between the lid and box so that different thicknesses of floor covering can be allowed for.

9 Claims, 5 Drawing Sheets

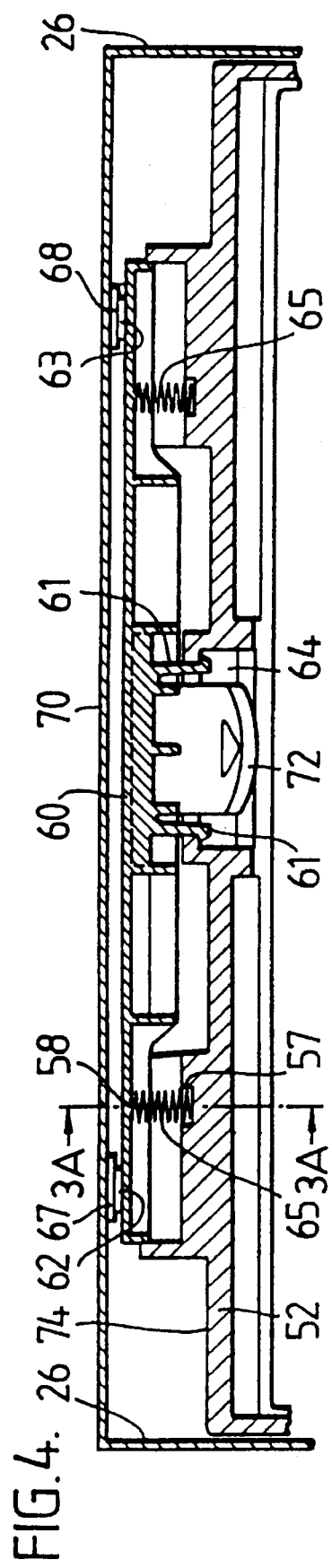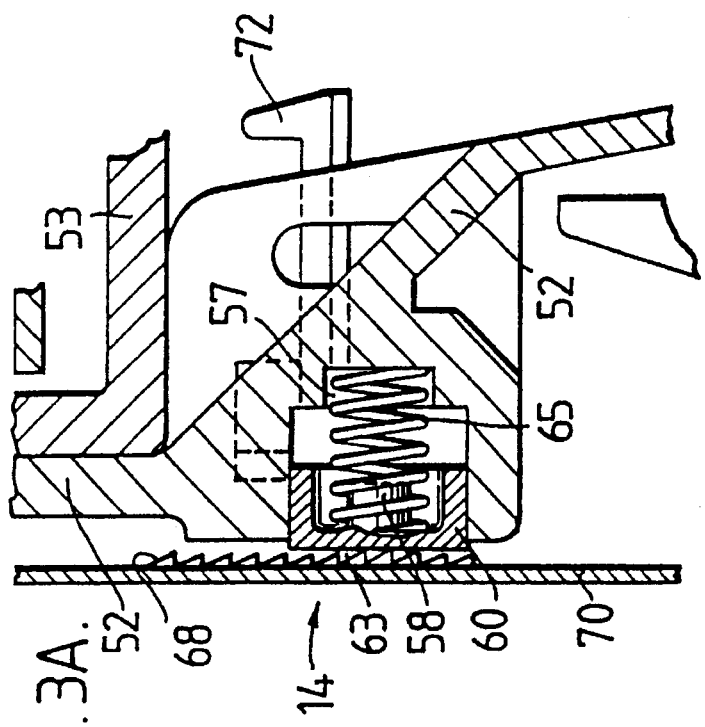

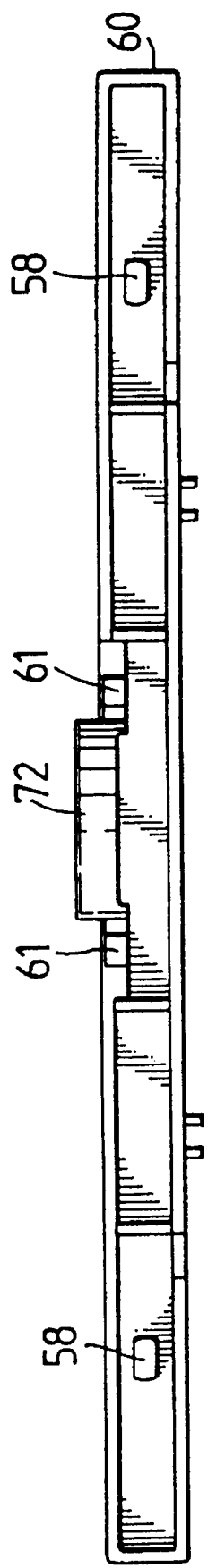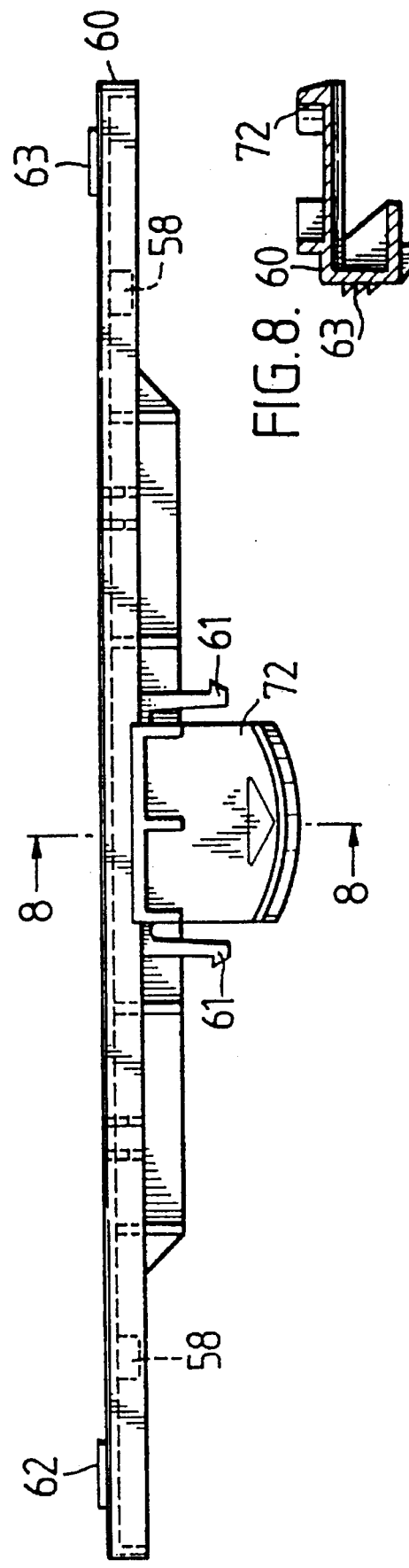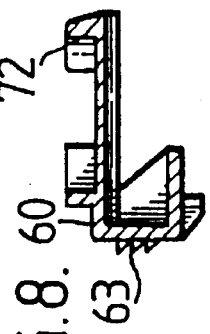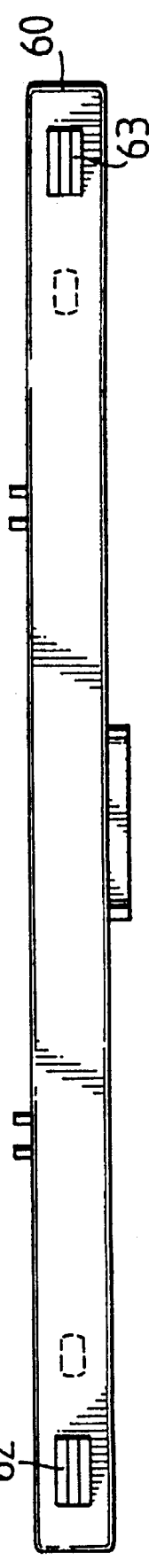

OUTLET BOXES

CROSS-REFERENCE TO RELATED APPLICATION(S)

This application is the national phase entry under 35 USC 371 of International Application No. PCT/GB92/01101, filed Jun. 18, 1992.

BACKGROUND OF THE INVENTION

1. Field of the Invention

The present invention relates to electrical outlet boxes for raised floors.

2. Description of the Prior Art

Outlet boxes for raised floors commonly comprise a metal box with suitable means to mount the box to a floor panel. The box has an open bottom into which several metal containers are fixed. Electrical sockets and/or switches are mounted in turn in the containers. The box is arranged to accept in its top a lid assembly which includes a main lid in which are cable outlet lids and a peripheral flange which extends around the assembly. After mounting the box to the floor panel carpet is laid over the floor panel and around the box, the lid assembly is located over the box so that the peripheral flange seats on top of the carpet. Outlet boxes constructed with this arrangement in mind are shown in EP 0343754 A1, GB 2194975A and GB 1583946.

In order to allow for different thicknesses of carpet and floor panel material it is known to adjust the box height relative the floor panel and the lid assembly relative the outlet box. In GB 2194975 the fixture to and adjustment relative to the floor panel is by means of an angular section bracket screwed at each end to opposed vertical sides of the box with adjustment enabled by providing three holes at each end of a vertical web of the bracket. In order to adjust the height of the bracket relative the box, the two screws are removed and reinserted in upper or lower pairs of holes. The carpet is then laid and the lid assembly is inserted in the box and is screwed down so that a flange around the assembly seats on top of the carpet. This is time consuming and furthermore as the carpet compresses during use the screws work loose. A further disadvantage is that during fitting the box which has no bottom tends to distort so that screw receiving brackets in the box misalign with the screws in the lid assembly causing further fitting difficulties.

SUMMARY OF THE INVENTION

Accordingly an electrical outlet box for raised floors according to the invention comprises a metal box with a lid assembly, means for adjusting the height of the lid assembly relative to the box, the box being adapted to have mounted in the bottom thereof electrical sockets and/or switches, the box having means for adjustably securing the box to a floor panel characterised in that the means for adjusting the height of the lid assembly relative to the box comprises a pawl and ratchet arrangement between at least one side of the box and the lid assembly with a handle to enable releasable engagement between pawl and ratchet means of the arrangement.

The advantage of the arrangement according to the invention is that the pawl and ratchet height adjustment arrangement enables the lid assembly to be quickly adjusted for height and furthermore the lid assembly can be quickly removed to take the box out and further as the carpet compresses during use the lid assembly is simply pushed further down into the box. The lid assembly which is generally rigid can easily be securley fitted into the box which is somewhat flexible.

Preferably the pawl and ratchet arrangment comprises at least one and preferably four ratchet means on the box sides. Preferably two ratchet means are on one side whilst two are on the other box side. Preferably there are two pawls on each side mounted to a single pawl bar with a handle to pull the pawls out of engagement with corresponding ratchet means.

In a preferred embodiment the pawl bar is provided with a spring towards each end so that any lack of parallelism between the lid assembly and box may be taken up by the springs. Preferably the or each pawl is a ratchet with teeth facing opposite directions to teeth of the ratchet means.

BRIEF DESCRIPTION OF THE DRAWING

An embodiment of the invention will now be described with reference to the accompaning drawings in which:

FIG. 3A is an enlarged cross section of area A of FIG. 3 showing a pawl and ratchet arrangement, taken at 3A—3A of FIG. 4, FIG. 4 is a cross section of a pawl bar for adjustably securing the lid assembly of FIG. 2 to the box of FIG. 1., FIG. 5 is an elevation of pawl bar of FIG. 4 seen from inside the lid assembly, FIG. 6 is a plan view of the pawl bar of FIG. 4 seen from above, FIG. 7 is an elevation of the pawl bar of FIG. 4 in a direction looking from the outside of the box into the centre of the box and FIG. 8 is a cross section of the bar of FIG. 6 taken at 8—8.

DESCRIPTION OF THE PREFERRED EMBODIMENT

Figure 1:
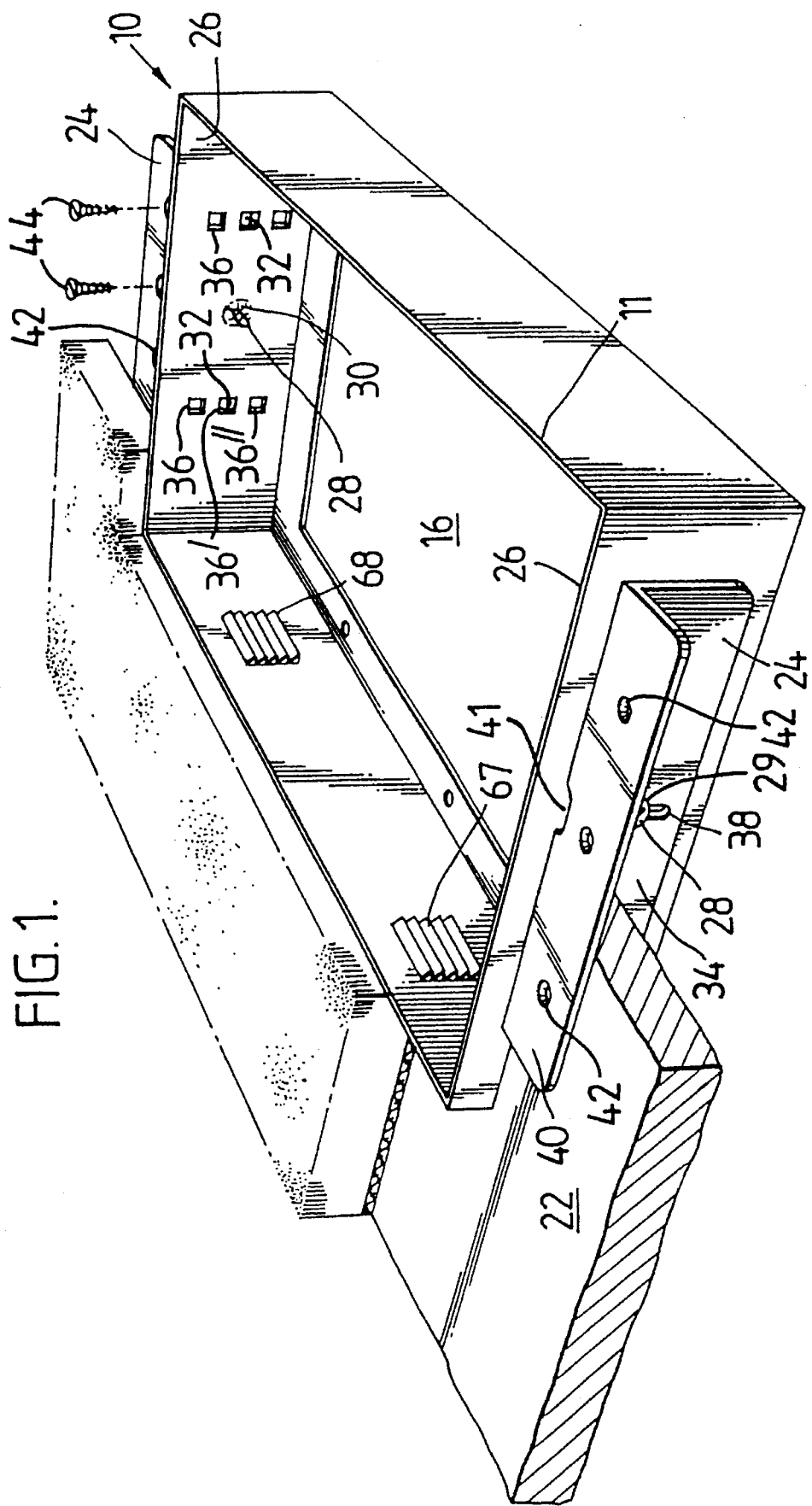
FIG. 1 is a perspective view of an outlet box according to the invention.
Figure 2:
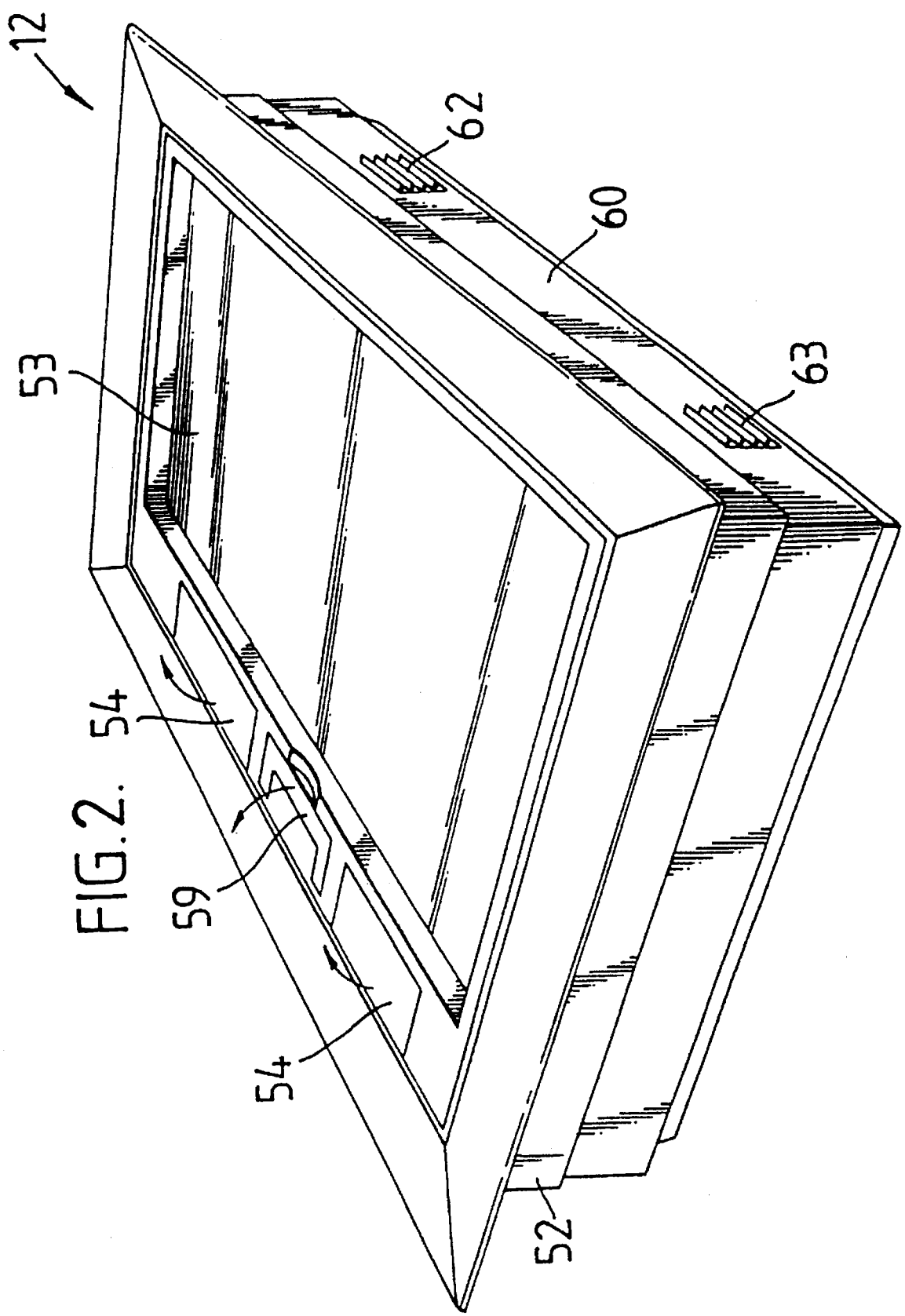
FIG. 2 is a perspective view of a lid assembly for the box of FIG. 1.
Figure 3:
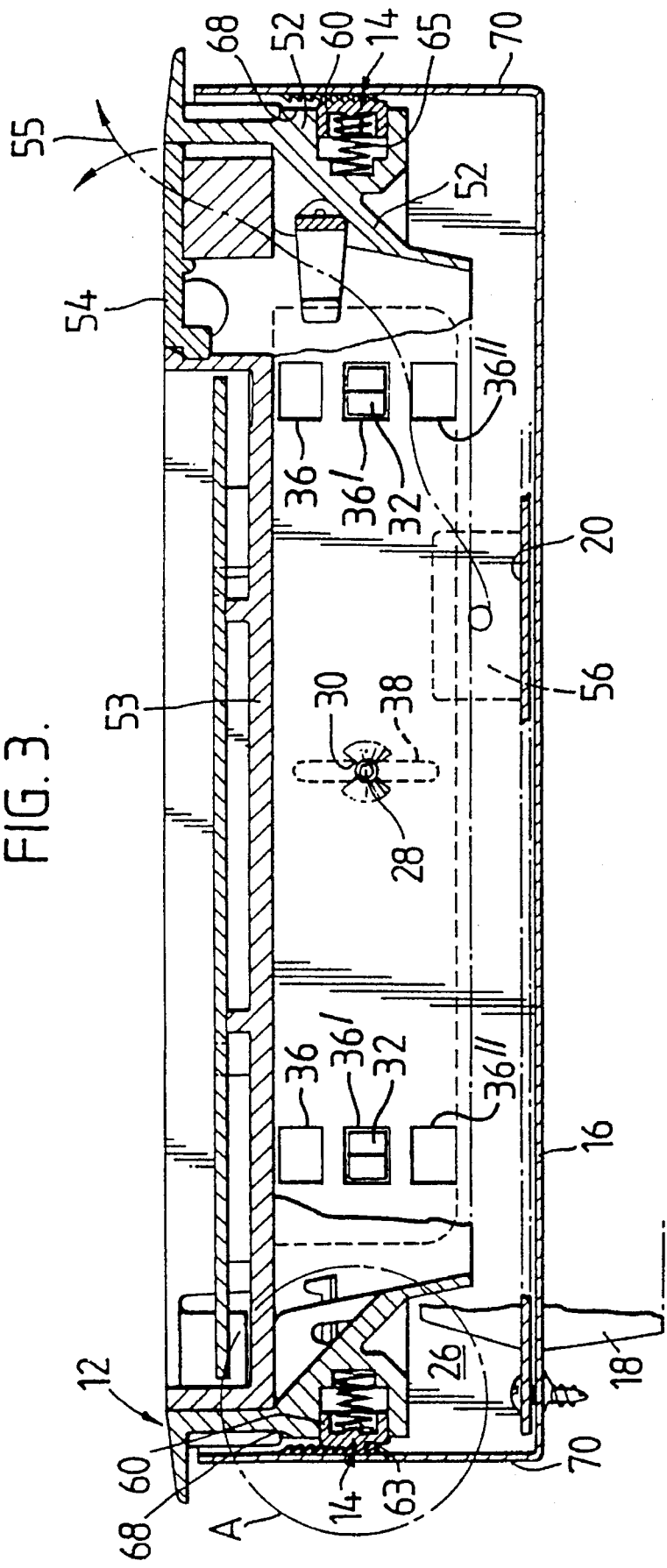
FIG. 3 is a cross section of the box of FIG. 1 with the lid assembly mounted in the top of the box.

In FIG. 1 there is shown an electrical outlet box 10 for raised floors. The box has a lid assembly generally shown at 12 in FIG. 2, the box 10 has an open top 11 into which the lid assembly is fitted and which is retained by ratchet arrangements 14 as shown in FIG. 3. The box has an open bottom into which are fitted modular containers 18 in which are mounted electrical sockets 20, and/or switches (not shown). The box 10 has a means for adjustably securing the box to a floor panel 22 which comprises at least one and preferably two brackets 24 adjustably clamped to a side 26 of the box by a central clamping means or pan head screw 28 which is received by an indented threaded hole 30 in the side and preferably both sides 26 of the box. Instead of threaded hole 30 a nut locked to the box side may be provided.

Each bracket 24 has a protrusion recess arrangement to locate it adjustably on either side of the box. This arrangement comprises a pair of horizontally spaced protrusions 32 on the vertical web 34 of the bracket which locate selectively in recesses formed as paired apertures 36, 36', 36", the pairs being vertically spaced in sides 26. A vertical slot 38 in web 34 enables the bracket to be slid up or down on screw 28 when the screw is unscrewed sufficiently to allow protrusions 32 to escape from apertures 36, 36', 36" and so that the pairs of protrusions can be realigned to another pair of apertures. Furthermore, the bracket can, once the screw 28 is unscrewed, be rotated through 180 degrees to enable horizontal web 40 of the bracket to assume a different level. A cut out 41 above slot 38 at the junction between webs 34 and 40 enables the pan head 29 of screw 28 to slide the full distance of slot 38. Three holes 42 on web 40 are provided to receive screws 44 for screwing the box to floor panel 22.

The lid assembly comprises a lid frame or surround 52, a hinged lid 53 in which are hinged cable openings 54 for cable shown as a broken line 55 from a plug 56 in one of several sockets 20. A handle 59 is for opening the lid.

The ratchet arrangement 14 comprises two pawl bars 60 each with a first vertical row of teeth 62 and a second vertical row of teeth 63 towards each end of the bar. Teeth 62 and 63 are each sprung by one pair of coil springs 65 onto a ratchet means formed by two horizontally spaced toothed ratchet surfaces 67 and 68 on each opposed side 70 of the box. The toothed surfaces 67, 68 can either be provided by forming portions of sides 70 by punching or else by attaching already formed toothed elements to the sides 70.

Springs 65 are each held between the pawl bar 60 and the frame 52 by means of a recess 57 in the frame and a protrusion 58 on the pawl bar. The pawl bar 60 is held in a recess 59 in the frame by means of a pair of hooked arms 61 engaging with inner sides of recess 64 of the frame through which handle 72 protrudes.

The teeth formed like saw teeth on toothed surfaces 67, 68 on box sides 70 face those of a similar form on bars 60 so that the scope of opposed teeth are in opposite directions in the sense that the box teeth slope downwards and the bar teeth slope upwards. This ensures that when frame 52 is pushed into box 10, the engaging teeth allow entry but prevent the frame escaping from the box. To remove the frame from the box it is merely necessary to pull centrally mounted handle 72 towards the box centre to release the engagement of the teeth.

It will be appreciated that if side 70 of box 10 is not quite parallel to the opposed side 74 of frame 52, then the laterally separated springs 65 takes up any divergence in parallelism to ensure both sets of teeth 67, 62 and 68, 63 fully engage to hold the frame 52 securely in box 10.

We claim:

1. An electrical outlet box for raised floors comprising a metal box (10) with a lid assembly (12), means (14) for adjusting the height of the lid assembly relative to the box, the box being adapted to have mounted in the bottom thereof electrical sockets and/or switches (20), the box having means (24) for adjustably securing the box to a floor panel (22) wherein the means (14) for adjusting the height of the lid assembly (12) relative to the box (10) comprises at least one pawl means (62, 63) and at least one ratchet means (67, 68) between at least one side of the box and the lid assembly with a handle means to releasably engage said pawl means and said ratchet means.

2. An outlet box as claimed in claim 1 wherein the pawl and ratchet means comprises at least one ratchet means (67,68) on the at least one side (70) of the box.

3. An outlet box as claimed in claim 1 or 2 wherein said metal box comprises a pair of opposed sides, two ratchet means (67, 68) are on one side (70) of said pair of sides of the box and two ratchet means (67, 68) are on the other side (70) of said pair of sides of the box.

4. An outlet box as claimed in claim 3 wherein said lid assembly comprises a pair of opposed sides and a pair of said pawl means (62, 63) are mounted on each side of said lid assembly, each pair mounted to a single pawl bar (60) to pull said pawl means of out engagement with a corresponding ratchet means (67, 68), said handle means comprising a pair of handles (72), each handle mounted on a respective pawl bar for manual actuation thereof.

5. An outlet box as claimed in claim 4 wherein each pawl bar (60) is provided with a pair of springs (65) to urge said pawl means (62, 63) into engagement with a corresponding ratchet means (67, 68).

6. An outlet box as claimed in claim 5 wherein said pawl means (62, 63) comprises a plurality of teeth extending from said pawl bar (60).

7. An outlet box as claimed in claim 1 wherein the means (24) for adjustably securing the box to a floor panel comprises at least one bracket (24) adjustably clamped to a side (70) of the box (10) by a central clamping means (28), a protrusion and recess arrangement (32,36) between the bracket and box side on opposite sides of the clamping means such that the protrusion and recess arrangment enables location of the bracket relative to the box side at several vertical positions.

8. An outlet box as claimed in claim 7 wherein the clamping means is a single screw (28) inserted through a central vertical slot (38) in the bracket and received by a threaded portion (30) of the box side or a nut locked to the box side.

9. An outlet box as claimed in claim 8 wherein the protrusion and recess arrangement comprises a pair of protrusions (32) from the bracket disposed on opposite sides of the central vertical slot (38) for the clamping means (28) and a plurality of pairs of vertically spaced recesses (36, 36', 36") in the box wall (70) on opposite sides of the clamping means.

* * * * *